June 29, 1965   R. H. REISS, SR., ETAL   3,191,212
ADJUSTABLE FLOOR GLIDE
Filed Oct. 24, 1962
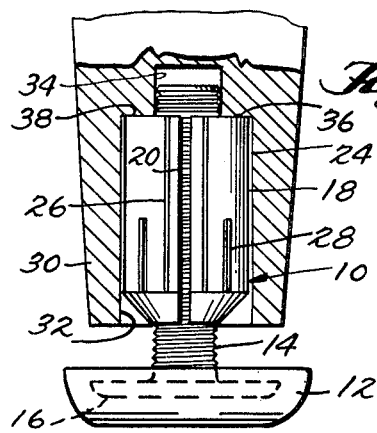
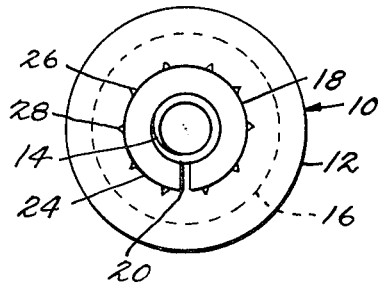
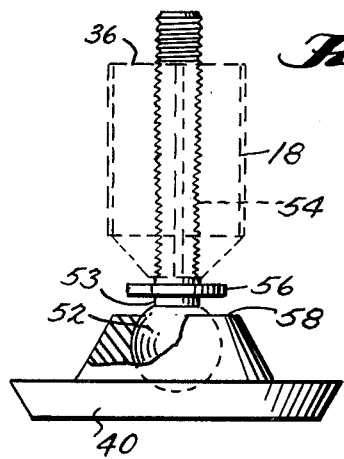
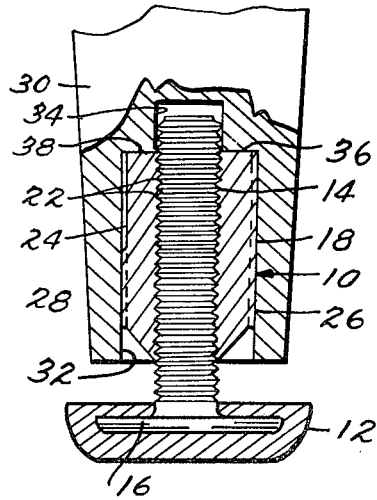
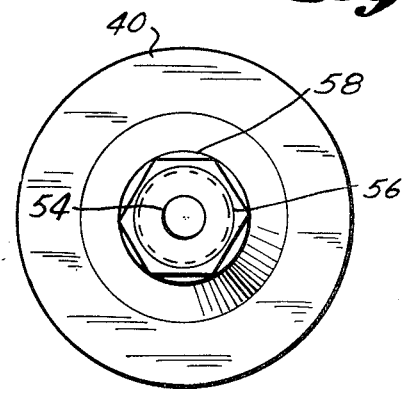
INVENTORS
RAYMOND H. REISS, SR.
RAYMOND H. REISS, JR.
BY PAUL R.T. HAHN
ROBERT J. RANDALL
Cushman Darby & Cushman
ATTORNEYS United States Patent Office 3,191,212
Patented June 29, 1965

3,191,212
ADJUSTABLE FLOOR GLIDE
Raymond H. Reiss, Sr., Deal, Raymond H. Reiss, Jr., Glen Ridge, Paul R. T. Hahn, Westfield, and Robert J. Randall, Morristown, N.J., assignors to Ronthor Reiss Corporation, New York, N.Y., a corporation of Delaware
Filed Oct. 24, 1962, Ser. No. 232,849
7 Claims. (Cl. 16—42)

This invention relates to floor glides and more particularly to improved furniture floor glides that adjust to compensate for discrepancies in height between floors and furniture legs.

Floor glides that are presently on the market utilize a so-called T-nut which is inserted in a previously drilled hole in the bottom of the furniture leg. This normally metal T-nut has a threaded hole in to which is inserted a metal screw having a plastic head secured thereto, the head being in contact with the floor when used. By screwing the plastic headed screw into or away from the T-nut, adjustment of the furniture leg relative to the floor is accomplished.

The plastic head of the screw may also be pivotable about the screw base so as to be applicable to an angled furniture leg. Typically, this pivotable plastic head is mechanically applied to the screw base by means of a pin driven through the plastic head and into the base of the screw.

The floor glides described heretofore have a number of deficiencies which are overcome by the present invention. In particular, the invention provides for a more readily assembled and adjusted floor glide by the fact that the screw or shank portion of the glide is unitarily molded to a plastic type bushing and plastic head during the molding of these latter two elements. The threads of the screw portion in turn thread the hole in the center of the plastic bushing by the mere fact that the latter is cast therearound. One immediate labor advantage is that the person manufacturing the glide does not have to independently thread the hole in the bushing. In addition, the person utilizing the glide does not have to screw the plastice headed screw member into the bushing because the bushing is already cast therearound and, in effect, is already screwed on. This also results in a substantial saving of labor time by furniture manufacturers who apply the invention to their furniture. A simple turn or two of the plastic headed shank will serve to adjust the height of the furniture leg to which it is inserted, relative to the floor.

Other advantages that are achieved by the invention include the fact that the plastic bushing tends to be more tightly secured to the head so that once the glide is adjusted to the desired height, no additional adjustment is required. In the case of metal T-nuts, the metal to metal contact of the T-nut with the screw, particularly because of wide tolerance of thread dimensions, results in a loose union that easily varies through prolonged use of the glide, thus necessitating periodic adjustment of the height thereof.

Returning to the modification of the floor glide using a pivotable plastic head, our invention permits the molding of such head directly around a screw as to immediately provide pivoting action upon movement of the plastic head following molding. This aspect of the invention will be more fully described hereinafter, but, as will be appreciated, the one step molding of plastic head to the screw member results in a significant saving of labor cost in the manufacture of the pivotable glide.

With the above in mind, the primary object of the invention is to provide a plastic floor glide that is easily assembled, that is readily adjustable in height, and that will remain at the height to which it is adjusted, over prolonged periods of use.

Another object of this invention is to provide molded plastic floor glides having a threaded metal shank projecting therefrom that is secured thereto during the molding of the glide.

It is a further object of this invention to provide a plastic floor glide having a metal shank projecting therefrom and an internally threaded split bushing molded on the metal shank.

Another object of this invention is to provide a floor glide having a threaded shank pivotably secured to it by an integral socket in the glide which is molded about one end of the threaded shank at the time the glide is formed.

It is yet another object of the present invention to provide a floor glide having a plastic floor contacting member molded on one end of a threaded shank and a height adjustable split bushing molded on the other end of the threaded shank.

These and other objects of the present invention are more fully set forth in the following detailed description having reference to the attached drawing wherein illustrative embodiments of the invention are shown.

In the drawing:

FIGURE 1 is a side elevation view of the invention associated with a furniture leg, partially broken away;

FIGURE 2 is a top plan view of the embodiment shown in FIGURE 1;

FIGURE 3 is a view similar to FIGURE 1 showing the bushing and button in section.

FIGURE 4 is an elevation view of another embodiment of the invention; and

FIGURE 5 is a top plan view of the embodiment shown in FIGURE 4 with the bushing removed.

With more particular reference to the drawing, an adjustable floor glide embodying characteristics of the invention is indicated at 10. The adjustable glide 10 comprises a floor contacting glide button 12, and a metallic threaded screw or shank 14 secured to the glide button 12 by an integral head 16 around which the glide button is molded. As shown in FIGURE 1 the head 16 is embedded in and rigidly secured to the glide button 12 and the threaded shank is thereby held substantially perpendicular to the plane of the glide button, although an angular relationship could be provided between these two elements by using a slant headed threaded shank, by tipping the shank with respect to the mold cavity during the glide button molding process, or by providing a glide button having a wedge shaped cross section.

Positioned at the opposite end of the threaded shank 14 from the glide button 12 and shank head 16 is a threaded bushing 18. Bushing 18 is generally cylindrical and has a gap 20 therethrough which extends longitudinally the length of the bushing 18 for a purpose more fully set forth hereinafter.

Bushing 18 is preferably molded of a self-lubricating plastic material such as polyoxymethylene (Delrin), polyethylene, nylon or the like. According to the principles of the present invention, the split threaded bushing 18 and the glide button 12 are both molded directly on the threaded shank thereby eliminating separate steps to cut interior threads 22 and to form the gap 20. In addition, split threaded bushing 18 may be integrally formed on the outer surface 24, circumferentially spaced axially extending anti-rotation flutes 26 and circumferentially spaced axially extending barbs 28.

An important function of the gap 20 is to allow the threads of the bushing 18 to be freed from their "as molded" position on the threaded shank 14. It was found that there is a tendency for bushings not molded with such a gap to "freeze" at their "as molded" position on the shank so that they could not be turned with respect to the shank to change their longitudinal position thereon. The gap 20 allows the bushing 18 to slightly expand when a torque is applied thereto after the molding procedure, thereby freeing the bushing and enabling it to rotate with respect to the shank as to change the longitudinal position of the bushing on the shank. In addition, the gap 20 allows the bushing to expand and contract radially during assembly with the furniture leg and during subsequent height adjustment.

In joining the adjustable floor glide of the invention to a furniture support such as a chair leg 30, a hole 32 having a diameter slightly smaller than the combination of bushing 18, flutes 26, and barbs 28, is formed in the leg 30 at the floor contacting end thereof. Hole 32 has a depth substantially equal to the length of the bushing 18, and may have formed at the upper end thereof a coaxial extension 34 of a diameter slightly greater than the width of the threaded shank 14. An adjustable glide assembly is then positioned so that the split bushing 18 is adjacent the hole 32 and the assembly is axially aligned with the hole. Using an instrument such as a conventional press, the assembly is then advanced in the hole 32, avoiding sharp blows on the glide button 12, until the inner end 36 of the bushing 18 abuts the shoulder 38 of the hole 32.

According to the invention, the hole 32 including the extension 34, may be drilled in leg 30 in a single step using a drill having a smaller and a larger cutting section, each being coaxial, and integrally joined to the other. As another alternative, the hole 32 may be bored having a constant width and the bushing 18 may be formed as a cup-shaped split end cap on the threaded shank.

In like manner similar adjustable glides may be provided for the remaining legs of the furniture article. The furniture article is then turned right side up so that it rests on the glides 10 and the glide buttons hand rotated until the furniture article rests levelly and firmly on the floor. The self-lubricating threaded fit between the split bushing 18 and the threaded shank 14 on which it was molded assures that there will be enough frictional contact to provide a height adjusting means for the glide that may be actuated by hand and will remain at the height at which it has been set. Additionally, the appearance of a finished furniture article with which glides of the invention have been associated is enhanced by the clear cut modern appearance of the glide buttons.

The further embodiment of the invention shown in FIGURES 4 and 5 is similar in all respects to the one shown in FIGURES 1-3, with the exception that the glide button 40 is molded around and partially envelops a generally rounded head 52 integrally secured to one end of a threaded shank 54. Although a spherical head 52 has been illustrated in FIGURES 4 and 5, it should be clear that other configurations for the head are possible, it being only necessary that the head be of such rounded shape as to allow pivoted motion between it and the glide button molded therearound. Shank 54 is similar to shank 14 except that there may be provided an integral hex nut-like collar 56 on the threaded portion a short distance above the head 52. In the fabrication of the assembly shown in FIGURE 4, a split threaded bushing 18, identical to the one shown in FIGURE 1, is molded on shaft 54. FIGURE 5 is a top view of the glide of FIGURE 4 with the split threaded bushing removed.

The swivel type adjustable floor glide assembly shown in FIGURE 4 is associated with a furniture support member in a manner identical to that set forth for the non-swiveling type described above.

In use, the swivel type glide button 40 is pivotable about the ball and socket joint formed with the rounded shank head 52. The glide button is pivotable between the position shown and any position wherein the upper shoulder 58 on the glide button 40 contacts the lower surface of the collar 56. If collar 56 is omitted, a non threaded portion 53 prevents the bushing 18 from abutting the shoulder 58 and interfering with swiveling of the glide button 40. Normally, the glide button is pivotable about 25 degrees in any direction from the flat position. This invention provides an adjustable glide and firm support for a furniture article situated on a non-level surface, or may be used to provide adjustable gliding and supporting means for a non-perpendicular furniture leg.

Although specific embodiments of the invention have been shown to illustrate the principles of the invention, it will be realized that many modifications are possible without departing from the purview of these principles and, therefore, this invention should be limited only by the spirit and scope of the following claims.

We claim:

1. In combination with a furniture leg having a generally cylindrical hole bored therein at the bottom in a direction generally parallel to the longitudinal axis of the leg, an adjustable furniture leg floor glide system comprising a threaded metal shank; an elongated shank head integrally secured to one end of the shank; a glide button of thermoplastic material molded in place on the shank held so as to at least partially envelop the shank head; a bushing of thermoplastic material molded directly onto the shank intermediate the ends thereof so as to have cooperating threads coincidentally molded therein, said bushing being split by a narrow gap extending parallel to the longitudinal axis of said bushing along the entire length of said bushing said bushing being positioned in the hole so that the guide button protrudes beneath the furniture leg.

2. A method for forming an adjustable floor glide comprising molding a thermoplastic glide button over the enlarged head of a threaded shank so as to partially envelop the shank head, and molding a thermoplastic bushing on the threaded shank intermediate the ends of the shank thereby forming internal threads in the bushing which mate with the threads on the shank, and forming a gap through the wall of the bushing as the bushing is molded on the threaded shank, said gap extending the entire length of the bushing parallel to the longitudinal axis thereof whereby application of a torque to said shank after said molding step will readily overcome any tendency of the plastic to freeze to the shank.

3. A floor glide comprising a threaded shank having an enlarged floor engaging portion at one end and a thermoplastic bushing molded directly on the threaded shank intermediate the ends thereof so as to form mating threads within the bushing thereby providing means to adjust the distance between the floor engaging portion and the bushing, said thermoplastic bushing being split by a narrow gap extending along the entire length of said bushing.

4. A floor glide as in claim 3 wherein said floor engaging portion includes an enlarged head on the end of said shank and a thermoplastic floor engaging button molded directly on the head so as to envelop the same.

5. A floor glide as in claim 3 wherein said floor engaging portion includes an enlarged head on the end of said shank, said head being generally rounded and free of projections and a thermoplastic glide button molded directly on and partially enveloping said head to form a ball and socket type pivotal connection between said glide button and said enlarged head, substantially the entire surface of the socket being in engagement with the surface of said enlarged head.

6. A floor glide comprising a shank having an enlarged metal head at one end, said head being generally rounded and free of projections and a thermoplastic glide button molded directly on and partially enveloping said head to form a ball and socket type pivotal connection between said glide button and said enlarged head, and a collar on said shank above said button to limit pivotal movement of said button, substantially the entire surface of the socket being in engagement with the surface of said enlarged head.

7. A floor glide comprising a shank having an enlarged metal head at one end, said head being generally rounded and free of projections and a thermoplastic glide button molded directly on and partially enveloping said head to form a ball and socket type pivotal connection between said glide button and said enlarged head, substantially the entire surface of the socket being in engagement with the surface of said enlarged head, the end of said shank opposite said button being threaded to receive a bushing, and the portion of said shank immediately above said button being unthreaded to prevent the bushing from moving close enough to said button to interfere with pivoting thereof.

References Cited by the Examiner

UNITED STATES PATENTS

| | | | |
|---|---|---|---|
| 436,308 | 9/90 | Diss | 16—43 |
| 2,254,973 | 9/41 | Nalle. | |
| 2,272,848 | 2/42 | Miller | 16—42 |
| 2,933,754 | 4/60 | Winans | 16—42 |
| 3,000,042 | 9/61 | Reynolds. | |
| 3,061,888 | 11/62 | Wadham | 18—59 |

ALBERT H. KAMPE, *Primary Examiner.*

DONLEY J. STOCKING, *Examiner.*